United States Patent [19]
Hochstein et al.

[11] Patent Number: 5,350,176
[45] Date of Patent: Sep. 27, 1994

[54] VIDEO GAME

[76] Inventors: Peter Hochstein, 2966 River Valley Dr., Troy, Mich. 48098; Jeff Tenenbaum, 6162 Wynford, West Bloomfield, Mich. 48322

[21] Appl. No.: 207,275

[22] Filed: Mar. 7, 1994

Related U.S. Application Data

[63] Continuation-in-part of Ser. No. 708,682, May 31, 1991, Pat. No. 5,292,125.

[51] Int. Cl.$^5$ .............................................. A63F 9/22
[52] U.S. Cl. ................... 273/148 B; 273/438; 273/DIG. 28; 273/364; 273/410
[58] Field of Search .............. 273/85 G, 148 B, 434, 273/435, 436, 437, 438, DIG. 28; 314/411

[56] References Cited

U.S. PATENT DOCUMENTS

| | | |
|---|---|---|
| 3,921,161 | 11/1975 | Baer . |
| 4,126,851 | 11/1978 | Okor . |
| 4,797,750 | 1/1989 | Karweit . |
| 4,939,767 | 7/1990 | Saito et al. . |
| 5,098,110 | 3/1992 | Yang ................ 273/438 |
| 5,292,125 | 3/1994 | Hochstein et al. ............. 273/148 B |

Primary Examiner—William H. Grieb
Attorney, Agent, or Firm—Reising, Ethington, Barnard, Perry & Milton

[57] ABSTRACT

A local video game (310) including a communicating controller (326). The controller (326) receives local command signals created by a set of player controls (316). The controller (326) also receives remote command signals received through a modem (324) which were created by a remote video game (320) through a similar set of player controls. The controller (326) includes a synchronizer (328) which produces synchronizing codes to be sent to the remote video game (320) to synchronize the games. The synchronizer (328) synchronizes the local and remote command signals such that both are received by a game microprocessor (322) simultaneously. Memory (336) stores the player parameters and are retrieved whenever the synchronization codes of the local (310) and remote (320) video games have not matched for a predetermined number of iterations.

13 Claims, 6 Drawing Sheets

VIDEO GAME

This patent application is a continuation-in-part of Ser. No. 708,682, filed May 31, 1991, now U.S. Pat. No. 5,292,125, issued to Hochstein et al. on Mar. 8, 1994.

BACKGROUND OF THE INVENTION

1. Field of the Invention

The invention relates to a communication assembly for portable video game consoles. More particularly, the subject invention relates to communication assemblies for a plurality of video game consoles located in remote locations.

2. Description of the Related Art:

The computer games which are commonly referred to as video games are games run by dedicated computers, i.e., computers hardwired for a specific purpose, using a video screen for a visual output. These video games are prevalent in the home environment because they can be connected to the television allowing children to play these games in the safety of the home.

A problem with the modern video games is that virtually all video games are designed to be played locally. In other words, the game software, game hardware, video modulator and video screen are all connected locally via cables. Player controls which relay player commands to the game are normally connected by means of removable cables. Therefore, in order for a player to compete with someone other than the computer, that person must leave the home or have someone come into the game-owner's home. This is a problem particularly for children who must rely on adults for transportation.

An example of such a system is disclosed in U.S. Pat. No. 3,921,161 to Baer, issued on Nov. 18, 1975. This invention details a game system connected to a television having two player ports and alternative input devices. The players, however, are limited in distance from the game due to the length of the cables connecting the controls to the game and the players' visibility of the television.

U.S. Pat. No. 4,126,851 to Okor, issued Nov. 21, 1978, shows an improvement to the video game wherein the type of game and the level at which it is to be played is programmable. Again, the video game limits the locality of the players to the immediate proximity of the television.

Although not a video game, a method and apparatus of transmitting and recording computer-generated displays is disclosed in U.S. Pat. No. 4,797,750 to Karweit, issued Jan. 10, 1989. The computer-generated image and audio signals are sent to a computer display. The same line of transmission is split wherein the same transmission is sent to an RS 232 communications line. The RS 232 communications line readies the transmission to be sent to a modem which, in turn, converts the transmission into audio tones to be transported over such medium as telephone lines to be received by such devices as other computers or a video camera recorder (VCR).

This system, however, lacks the ability to coordinate the transmission of an image along with a command signal input by a player. In other words, the subject invention of this patent can only convert and transmit data and is incapable of transmitting command signals in a manner which will make sense to another player receiving the transmission when these signals are incorporated into the signals generated by the receiver.

Again, not being a video game but a representation of the transmission of pictorial data, U.S. Pat. No. 4,939,767 to Saito et al., issued on Jul. 3, 1990, discloses an improved method and apparatus, typically referred to as a FAX machine, for sending images over telephone lines. This system forms non-signal states wherein data signals follow immediately thereafter. This system does not disclose any ability to coordinate different types of data, i.e., command, visual and audio signals. It merely converts images into a data signal and sends the data signal over the telephone line to be received by a visual telephone or FAX machine.

SUMMARY OF THE INVENTION AND ADVANTAGES

A video game synchronizing assembly is adaptable to communicate a local video game with a remote video game. The local video game includes a game microprocessor, at least two player ports, and a set of player controls electrically connectable to one of the two player ports; the set of player controls being manipulatable to create local command signals to be incorporated in the local video game to define player parameters. The video gone synchronizing assembly comprises a controller for receiving the local command signals from the set of player controls and remote command signals from the remote video game. The controller transmits the local and remote command signals to the local video game. A data link transmits the local command signals to the remote video game. The data link also receives a remote synchronization code and the remote command signals from the remote video game. The video game synchronizing assembly is characterized by synchronizing means for synchronizing the transmission of the local and remote command signals by the controller to the video game.

The advantage associated with the subject invention includes the ability to have a plurality of game operators playing the same game against each other or the computer wherein the game operators are located in remote locations with respect to each other.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFACED EMBODIMENT

Figure 1:
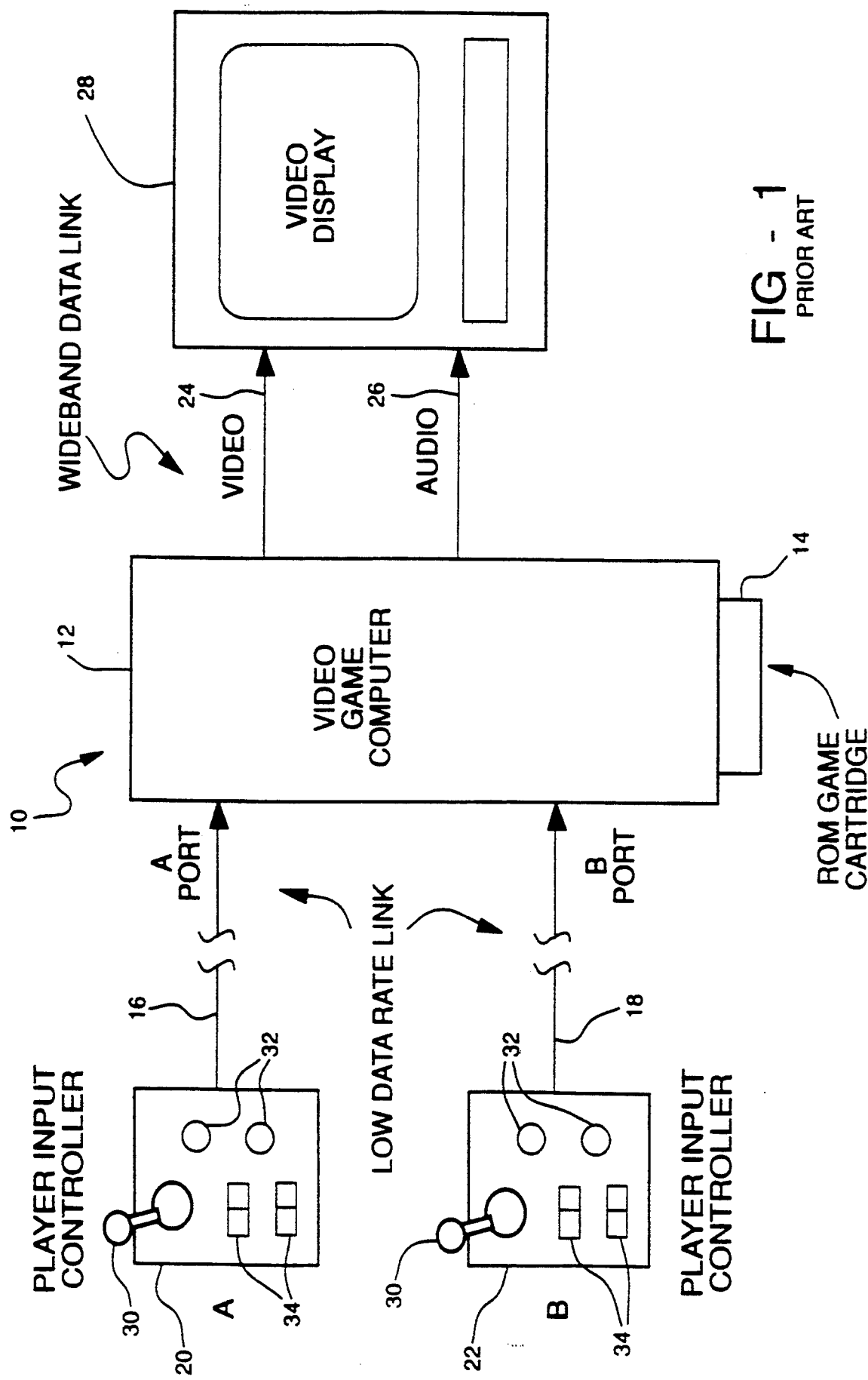
FIG. 1 is a block diagram of the prior art video game configuration.

Turning to FIG. 1, a block diagram of the current configuration of video games is generally shown at 10. The video game 10 includes a video game computer 12, a video game cartridge port (not shown) for receiving a video game cartridge 14, at least two player ports 16,18, at least one set (two shown) of player input controls 20,22, and cables 24,26. Although the number of player input controls and player ports are limited only by the design of the video game system and computer 12, only two of the player input controls and ports are shown for simplicity.

The video game cartridge 14 contains read only memory (ROM) for a particular game. Each game is provided in cartridge form so the consumer may purchase a single set of hardware once and then may purchase any number of games as desired. When a particular game is needed, the video game cartridge 14 is inserted into the video game port and the game is initialized and commenced.

The cables 24,26 are connected between the video game computer 12 and a video display 28, typically a television. The cables 24,26 are the medium through which video and audio signals pass, respectively.

The player input controls 20,22 contain various devices to input commands into the video game computer 12. Such devices include joysticks 30, knobs 32, and switches 34. Each player input control 20,22 is connected to the video game computer 12 via low data rate linkages 16,18. Typically, two player ports A,B are available so two players may compete against each other. Herein lies the disadvantage of requiring both players to be present to compete which renders one of the games dormant during the competition.

Figure 2:
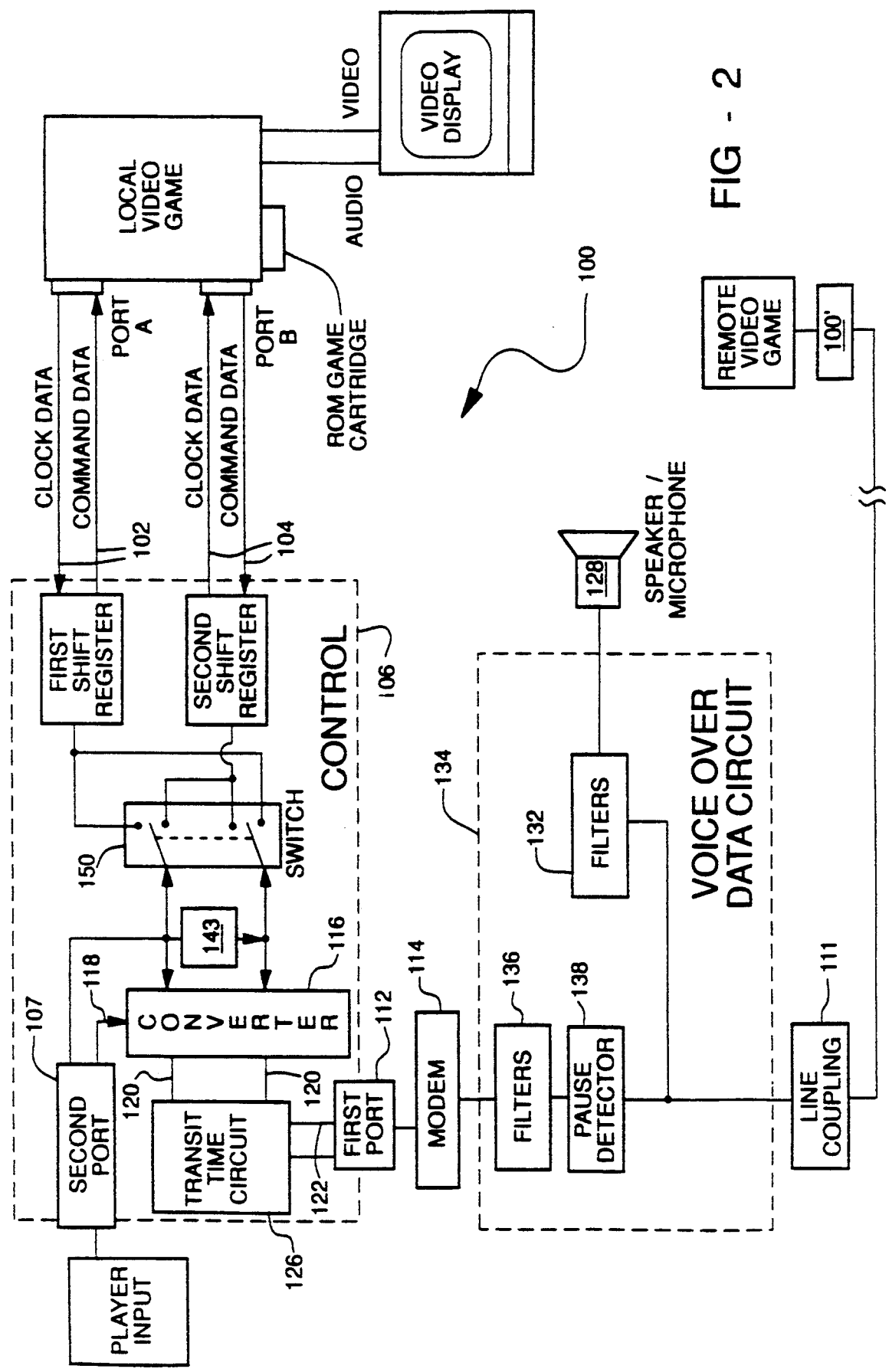
FIG. 2 is a block diagram of an embodiment of the subject invention.

As may be best seen in FIG. 2, the subject invention is generally shown at 100 in block form. The video display 28 is still audibly and visually connected to the video game computer 12 via the wideband data linkages 24,26, respectively. The video game cartridges 14 may still be varied depending on the player's desire.

The player input controls 20,22 are not, however, directly connected to the video game computer 12. One of the player input controls 20 is connected to the video game communication assembly 100 and the second player input control 22 is not used because the competitor will not be playing locally but in the comfort of his or her own home. The video game communication assembly 100 includes a plurality of connections 102,104, two shown in FIG. 2 to continue with the example, each being connected to the video game ports A,B. Clock data is sent over one of the plurality of connections 102,104 to coordinate the commands of the video game computer 12 with the receipt and transmission of command signals.

The video game computer 12 will hereinafter be referred to as the local video game 12 because the subject invention 100 is physically connected thereto, whereas the other video game computers used by players not located near the local video game computer will be referred to as the remote video game 30.

The video game communication assembly 100 includes control means 106 for controlling command signals received from second port means 107, which is electrically connected to one player input control 20, and for creating communication signals therefrom. When control means 106 receives the command signals from the player input controls 20 through the second port 107, the second port 107 sends the command signals to either the first 108 or second 124 shift registers and to converting means 116 which converts the command signals into communication signals. The second port 107 sends the preserved command signals directly to the local video game 12 in the same format in which it is received so the local video game 12 will not have to be altered electronically. In fact, the local video game 12 will not be able to detect a difference in inputs rendering the video game communications assembly 100 invisible to it.

The converting means 116 converts the command signals to communication signals to be sent over the communications medium to be eventually received by another video game communications assembly 100' used by the competitor. The transformation of the command signals before they are transmitted enhances the performance of the subject invention 100 because the command signals are transformed into communication signals which the intended transmitting medium is designed to carry. In the preferred embodiment, the transmitting medium is the telephone system 110, represented in the Figures as a telephone line 110. It should be obvious to those skilled in the art that any medium of transmission, i.e., radio waves, would be suitable for the subject invention 100 but there is a reduction in cost due to the elimination of a set of transmitters and receivers by using the telephone system 110. Telephone line couplings and protection networks 111 are used to connect the subject invention 100 to the telephone lines 110 and protect the subject invention 100 from any power surges that may occur over the telephone lines 110.

It should be noted that the actual coding of the command signals into communication signals is not part of the subject invention 100. The coding and decoding of the signals will be dependent upon the type of local video game 12 to which the subject invention 100 is connected. In the same vein, the actual connections of the subject invention 100 to the player input controls 20 and the input ports A,B will vary depending on the type of game used.

The video game communication assembly 100 further includes modem means 114 for bilaterally transmitting the communication signals between the control means 106 and at least one remote video game 30. In the preferred embodiment, the modem means 114 is a modem well known in the art of data transmission over telephone lines. The modem means 114 may, however, be any modulator/demodulator designed for any transmission system used.

The modem means 114 receives signals from the converting means 116 through first port means 112. The first port means 112 bilaterally transmits the communication signals between the control means 106 and the modem means 114. The first port means 112 also bilaterally transmits communication signals between the modem means 114 and second shift register 124, discussed subsequently.

The converting means 116 is used for converting the command signals received by the second port 107 into communication signals in serial data form and for converting the communication signals received by the modem means 114 into parallel data form to be used by the local video game 12. The converting means 116 is a full duplex universal asynchronous receiver-transmitter (UART). The UART 116 converts the parallel data received through lines 118 from the second port means 107 and transforms the data into serial form and transmitted through lines 120 to the modem 114. The UART 116 also receives the communication signals from the modem 114 in serial form through line 122 wherein this data is transformed into parallel form and is sent to second shift register means 124. As will be seen when viewing FIG. 3, the converting means 116 is a part of a microprocessor 140.

The second shift register 124 receives the communication signals transmitted by the converting means 116 and transforms the communication signals into command signals. These command signals are subsequently transmitted over connections 104 into port B of the local video game 12. The communication signals which are received by the modem means 114 are from the subject invention 100' of the competitor. In other words, port B of the local video game 12 will receive signals in the same format as the if the second player input control 22 was sending the command signals when, in fact, the command signals are being sent to port B through two video game communication assemblies 100,100', one video game communications assembly 100' located at the remote video game 30 transmitting communication signals and the other 100 physically connected to the local video game 12 receiving the communication signals and transforming those communication signals into command signals.

The video game communication assembly 100 is characterized by the control means 106 including transit time means 126 for determining the amount of time required for the communication signals to travel between the first port means 109 and the remote video game 30. The transit time means 126 establishes the delay time introduced by adding the additional circuitry, including the telephone system, to the local video game 12. In a substantial number of video games, the timing of the players' inputs is imperative to the proper functioning of the game.

The transit time means 126 sends out a simple identifying signal to the communicating means 112. This identifying signal is sent all the way to the control means 106 of the remote video game 30. The identifying signal is then sent back to the control means 106 connected to the local video game 12. The control means 106 then divides the elapsed time in half to determine how much time it takes for the communication signals to travel between the two video games. The identifying signal can be of any set frequency and pulse width so long as it does not interfere, i.e., have the same frequency, with the communication signal or voice signals (the voice signals will be discussed subsequently).

In order to enhance the competitive atmosphere of the event, the video game communication assembly 100 includes microphone means 128 for transforming acoustical vibrations created by the player using the local video game 12 into voice signals. In addition, the subject invention 100 further includes speaker means 128 for transforming voice signals received from player playing the remote video game 30 via the modem means 114 into acoustical vibrations. Although not necessary, the subject invention 100 has incorporated the microphone means and the speaker means into one, hereinafter referred to as the speaker/microphone means 128. The speaker/microphone means 128 allow the players to communicate between each other to aid in creating a more competitive atmosphere. The second filter means 132 is directly connected to the telephone lines 110 and filters out all communications signals and allows only voice signals to pass therethrough. As may be seen in FIG. 2, the speaker/microphone circuit 128,130,132 is bilateral or bidirectional in nature. The single circuit 128,130,132 handles vocal communications in both directions.

The subject invention 100 further includes voice over data means 134 for simultaneously receiving voice signals and the communication signals from the telephone line 110 and for transmitting the communication signals to the modem means 114. Since the communication signals fall within the voice bandwidth of signals carried over telephone lines, the continuous carrier tone imposed on the telephone line by the modem 114 is more than a moderate annoyance to the listener and player speech could easily scramble the communication signals. The voice over data means 134 permits simultaneous use of one voice grade telephone line for both the voice signals and the communication signals (data signals) by using first filter means 136, in conjunction with the second filter means 132 discussed above to filter out the communication signals. The first filtering means 136 include narrow band notch filters to filter the communication signals from the voice signals. The narrow band notch filters 136 correspond to the frequency standards of the Bell 103 system. In the Bell 103 system, four frequencies are used, two for sending information and two for receiving information. The two frequencies used for sending or originating information are 980 Hz, representing a mark or "1", and 1180 Hz representing a space or "0". The two frequencies used for receiving or answering information are 1650 Hz, representing a mark or "1", and 1850 Hz, representing a space or "0". The originating frequencies differ from the answering frequencies so communications can be transmitted in both directions at the same time. In other words, the voice over data means 134 is full duplex.

The end result of the first filter means 136 in conjunction with the second filter means 132 is that the voice signals do not have any communication signals interfering therewith and communication signals that have not been scrambled by the voice signals.

The control means 106 further includes pause means 138 for automatically pausing the transmission of both the command signals and the communication signals upon receipt of a pause signal. The pause means 138 allows the game currently being played to be interrupted so the telephone lines 110 may be used for communication purposes other than the ongoing video game communication. The pause means 138 can be used only where "Call Waiting" has been subscribed. The pause means 138 detects the incoming signal representing another call is being attempted. This "Call Waiting" signal is a standard tone burst signal superimposed over other transmissions, usually voice signals, and once it is recognized, the pause means 138 sends a pause signal to the control means 106 and the control means 106 immediately sends a pause signal to the local video game 12 and pauses or freezes all command, communication, and voice signals. The control means 106 also sends a pause signal to the remote video game 30 communications assembly so it too will pause until the termination of the call.

Continuing with the concept of pausing the game prior to completion, it should be noted that an additional problem exists due to the fact that at least one of the players is no longer in the proximity of the other: namely, only port A has the controls to pause, stop or select a game. The player using the remotely located video game has no control over these operation functions. Therefore, the first control means 106 includes operating means 142 for transmitting any operation signals received from the remote video game 30 to the first shift register means 106 so the operation signals may be received by the port A and the game can proceed as directed by either player independent of the player's location.

Figure 3:
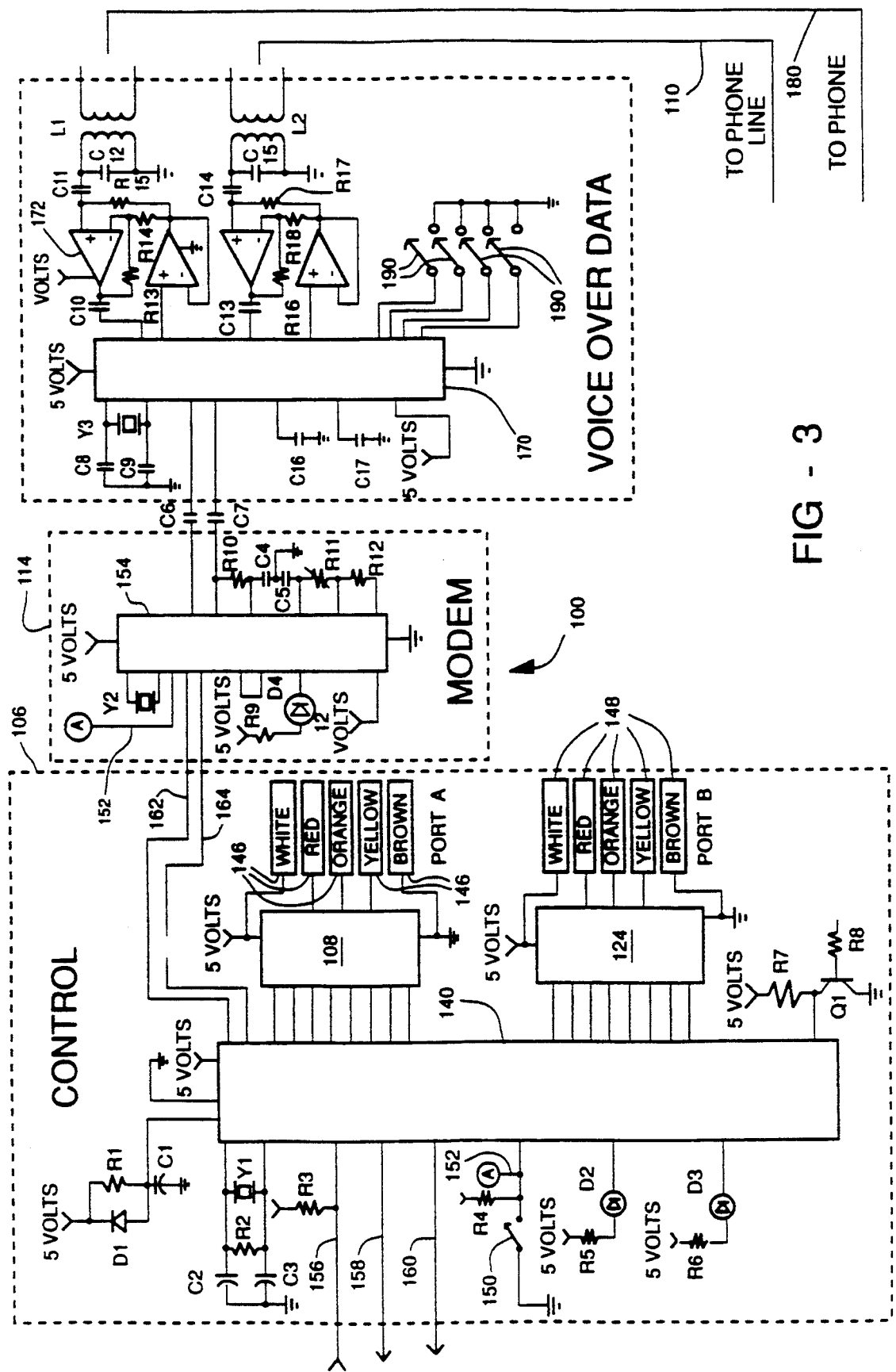
FIG. 3 is a schematic diagram of the circuitry of the embodiment of FIG. 2.

Turning our attention to FIG. 3, the video game communications assembly 100 is shown in circuit form. By way of example, the control means 106 includes a MC68HC85C3 microprocessor 140 manufactured by Motorola Corporation. Two eight bit shift registers 108,124, part number CD4021, are connected to the microprocessor 140 and each are connected to each of ports A and B, respectively. The five colored prongs 146,148 are inserted into the two ports A and B. The circuit 100 is powered on 5 Volt and 12 Volt levels. A diode D1 and a resistor R1 are connected in parallel between 5 Volts and the reset pin of the microprocessor 140. A capacitor C1 is connected between ground and both the diode D1 and the resistor R1. An oscillator Y1 is connected in parallel between two pins of the microprocessor 140 and a resistor R2. Two capacitors C2,C3 are each connected between one side of the resistor R2 and ground. This subcircuit establishes a oscillation frequency of approximately 3.6 MHz.

A resistor R4 is connected between 5 Volts, a switch 150 and a line 152 to a microprocessor chip 154, which is a dedicated modem 154, in the modem 114. The switch 150 is also connected to ground. The switch 150 determines whether the player using this video game communication assembly 100 is going to be player #1 or player #2. If the switch 150 is open, as if shown in FIG. 3, the player is player #1; and if the switch 150 is closed, the player is player #2. The player numbers are used to correlate how the video game communication assembly 100 will send the signals to their respective video games. For instance, if the player using the local video game 12 is player #1, his input will be sent to port A of the local video game computer 12. If, however, it is determined that the player using the local video game 12 is to be player #2, his command signals will be sent to the port B of the local video game 12.

The switch 150 is also connected, via line 152, to the modem 112, as is indicated by the letter A. The switch 150 must also signal the modem 112 as to what player number has been assigned to the player using the local video game 12. Therefore, a modem 112 is also able to send the command signals to the remote video game 30 using the format corresponding to the correct player number.

A resistor R5 is connected in series between 5 volts a diode D2. The diode D2 is also connected to the microprocessor 140. In the same manner, a sixth resistor R6 is connected in series between 5 Volts and a third diode D3, which is also connected to the microprocessor 140. A transistor Q1 is powered by the 5 Volts, through a resistor R7, and the gate of the transistor Q1 is connected to a resistor R8. The gate of the transistor Q1 is connected to the orange terminal 146 of port A. The line 156 receives information from the player controls 20. A resistor R3 is connected between the line 156 and 5 Volts. Lines 158,160 are also connected to the player controls 20, wherein the line 160 is connected to a clock or timing circuit in the player input controls 20.

The modem 112 has an oscillator Y2 connected in series between two pins of the modem 154. The oscillator Y2 oscillates at approximately 3.6 Mhz. Line 162 is connected to the modem 154 and is used to receive information from the microprocessor 140. A second line 164 is also connected to the microprocessor 140 and it transmits information from the modem 15 to the microprocessor 140. A diode D4 is connected between the modem 154 and a resistor R9. The resistor R9 is also connected to 5 Volts. The modem 154 is connected to a 12 Volt source. A resistor R10 is connected to an outgoing line 166 and to a capacitor C4. The opposite end of capacitor C4 is connected to ground. Resistors R11 and R12 are connected to a capacitor C5 which is also connected to ground. Another line 168 extends from the modem 154 to the voice over data circuit 134. Capacitor C6 and C7 are serially connected over lines 168 and 166, respectively, to couple the voice over data circuit 134 to the modem circuit 112.

The voice over data circuit 134 may be a full duplex voice over integrated circuit as is well known in the art. Alternatively, in FIG. 3, the voice over data circuit 134 includes a microprocessor 170. Two capacitors C8,C9 are connected between ground and a third oscillator Y3. The resulting oscillator Y3,C8,C9 oscillates at approximately 3.6 MHz. A capacitor C16 is connected between the ground and the voice over data microprocessor 170. Another capacitor C17 is also connected between ground and the voice over data microprocessor 170.

An amplifying circuit consisting of four operation amplifiers 172,174,176,178, hereinafter op amps, are used to amplify the signal received from the telephone line 110. A capacitor C10 is connected between the voice over data microprocessor 170 and the output of the first op amp 172. A resistor R13 is connected between the output of the first op amp 172 and the inverting input of the first op amp 172. A resistor R14 is connected between the resistor R13 and the noninverting input of the first op amp 172 and the output of the op amp 174. A resistor R15 is connected between the noninverting input of the first op amp 172 and the output of the second op amp 174. The output of the second op amp 174 is connected to the inverting input of the second op amp 174. The noninverting input of the second op amp 174 is connected directly to the voice over data microprocessor 170. A capacitor C13 is connected over the voice over data microprocessor 170 in the output of the third op amp 176. A resistor 116 is connected between the output of the third op amp 176 and the inverting input of the third op amp 176. A resistor R17 is connected between the inverting input of the third op amp 176 and the output of the fourth op amp 178. A resistor R18 is connected between the noninverting input of the third op amp 176 and the output of the fourth op amp 178. The output of the fourth op amp 178 is also connected to the inverting input of the fourth op amp 178. The noninverting input of the fourth op amp 178 is connected to the voice over data microprocessor 170. Capacitor C11 and C12 are connected to a first inductor L1 for coupling the line to the telephone 180 to the amplifying circuit. Capacitors C14 and C15 are connected to a second inductor L2 which couples the amplifying circuit to the phone line 110.

In operation, the method for communicating command signals of the a video game between a local video game 12 and a remotely located video game over a defined medium of communication include the steps of: receiving command signals from the player input controls 20; transferring the command signals to the local video game 12; converting the command signals to communication signals; and transmitting the communication signals to a remotely located video game. The method is characterized by delaying the transmission of the command signals to the local video game until the communication signals reach the remotely located video game. This insures the two video games 12, are coordinated because many games rely on the timing of the players when making their moves.

The method includes receiving communication signals representing command signals from the remotely located video game. These communication signals are converted back to communication signals and sent to the port designated for the remotely located player. The local video game 12 receives command signals into both ports and operates as if both players were playing locally.

The method further includes converting the command signals received by the player controls 20 into communication signals suitable for transmission in the communication medium. These communication signals are sent to the remote video game 30 where they are received, converted back into command signals, and transmitted to the same port that received the command signals in the local video game 12. In other words, the two remotely located players are playing two independent games wherein the command signals received and transmitted between the two remotely located games are mirror images of each other.

The method includes the steps filtering out the communication signals received from the communication medium from other signals. The other signals can be noise or voice signals. The voice signals are sent to the speaker 128 so the players can hear what the other player is saying, thus enhancing the competitive environment.

The method further includes the ability to pause the game being played upon the receipt of a pause signal representing another incoming call. The pause feature corresponds to the "Call Waiting" feature to which many phone users subscribe.

PREFERRED EMBODIMENT

Figure 4:
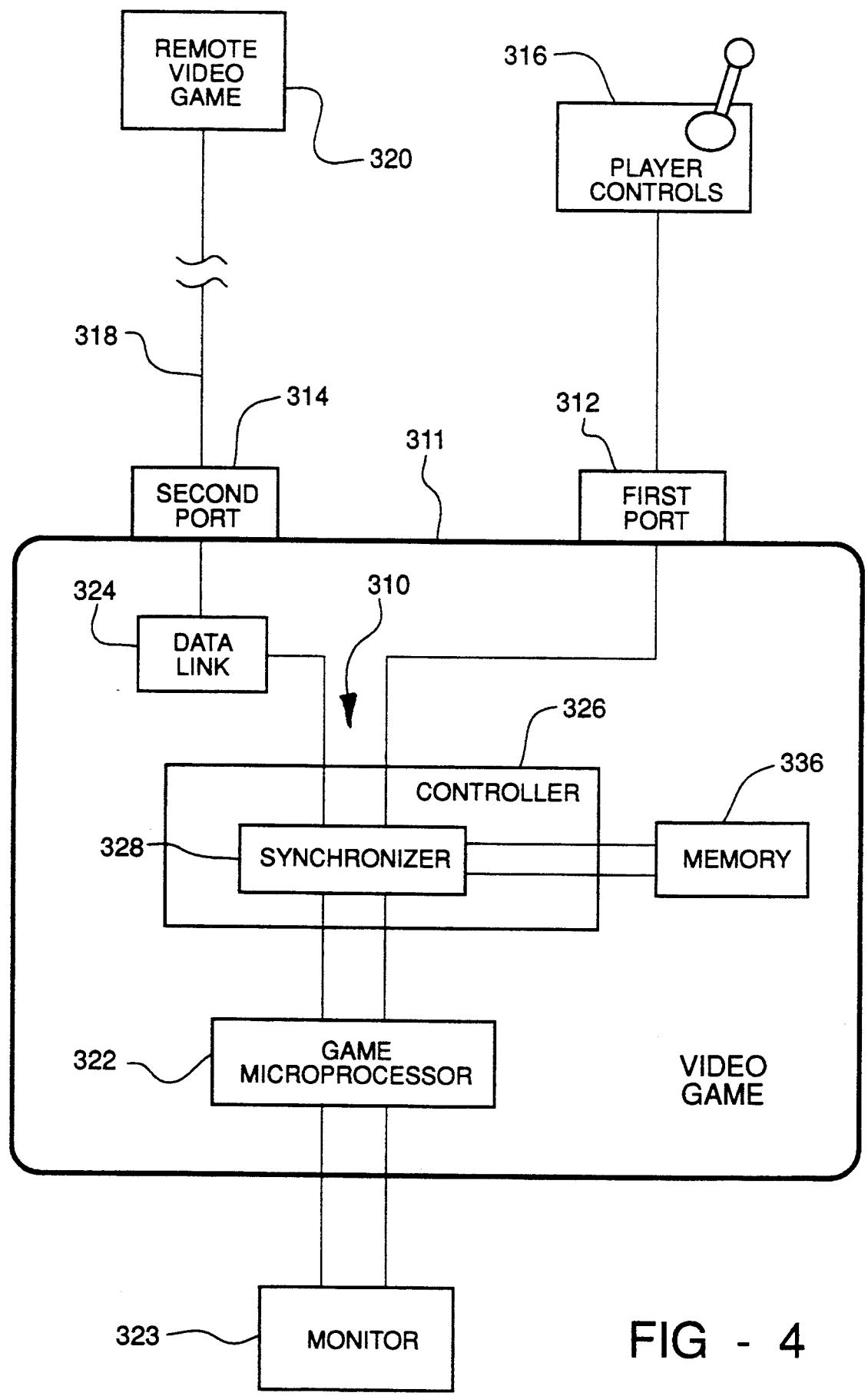
FIG. 4 is a block diagram of the preferred embodiment of the subject invention.
Figure 5:
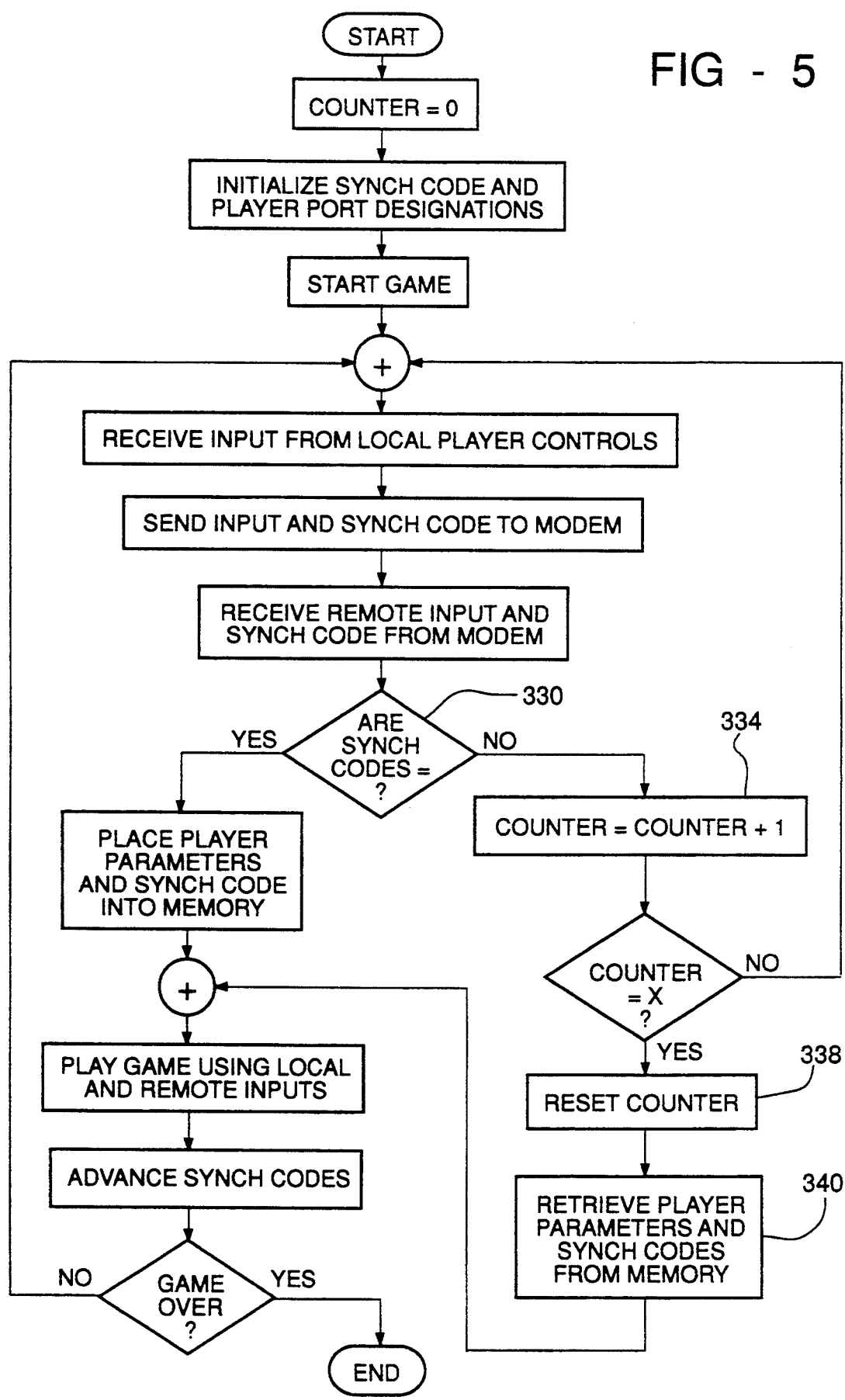
FIG. 5 is a flow chart representing the sequential steps of the synchronizer.

Turning to FIG. 4, the preferred embodiment of the invention is generally indicated at 310. The invention 310 is a video game assembly. The video game console 310 includes a first port 312 and second port 314. At least one set of player controls 316 is attached to the first port 312. The second port 314 is adaptable to receive either a second set of player controls 22 (see FIG. 1) or a communications line 318 connecting the video game console 310 to a remote video game console 320.

The local video game assembly 310 includes a game microprocessor 322 which, along with a game cartridge (standard in the art and shown in FIGS. 1 and 2) produces the interactive video game to be played by the remotely located operators of the game and viewed by the local operator via a monitor 323. The game microprocessor 322 is a standard microprocessor currently found in the art.

The set of player controls 316 is manipulatable by the local operator to create local command signals to be incorporated in the interactive video game. The set of local player controls 316 may be any style or embodiment of a set of controls, i.e., a keyboard, mouse, joy stick and the like, which is utilized by that particular game.

A data link circuit 324 transmits the local command signals to the remote game 320. The data link circuit 324 also receives a remote synchronization code and remote command signals from the remote video game. (Synchronization codes will be discussed subsequently.)

A controller 326 receives the local command signals and the remote command signals and sends the local command signals and the remote command signals to the game microprocessor 322. In the case of analog phone lines 318, the controller 326 includes a data link circuit 324 similar to the modem 114, voice over data circuitry 134 and microphone 128 disclosed above. The voice over data circuitry, can be used in conjunction with a Code-Excited Linear Prediction (CELP) speech compression algorithm or any other compression algorithm.

Alternatively in the case of digital phone lines 318, the data link circuit 324 may include a multiplexing circuit. The voice-over-data circuitry, which is a frequency domain manipulator, would be replaced by the multiplexing circuit because digital signals can be manipulated directly and do not require separation into frequency domains.

The local video game assembly 310 is characterized by synchronizing means 328 for synchronizing the transmission of the local command signals and the remote command signals to the video game 311 and, more specifically, the game microprocessor 322. The game microprocessor 322 must receive the local and remote command signals approximately at the same time. Because the human operator cannot detect small differences in the receipt of the local and remote command signals, a difference of up to one second or, in alternative terms, approximately thirty frames of video game advancement by today's technology standards, between receipt of the local and remote command signals is acceptable.

The synchronizing means 328 includes a synchronization code generating means 330 for generating a local synchronization code. The synchronization code is sent to the remote video game 320 via the data link 324. The controller 326 creates a signal over which the synchronization code and the current local command signals are sent to the remote video game 320. The controller 326 receives the remote synchronization code as well as the remote command signals in the same manner.

Therefore, the communications system between the local video game 310 and the remote video game 320 is asynchronous. More specifically, the local command signals and the local synchronization code are sent to the remote video game 320 regardless of what is received thereby. The command signals received from the player controls of the local video game 310 is matched with a synchronization code and sent over the communications line 318 to the remote video game 320 regardless of the information received from the remote video game 320.

In an alternative embodiment, the synchronization codes may be generated via a handshaking technology wherein the synchronization codes of the local video game 310 would not be generated until a similar synchronization code from the remote video game 320 has been received.

The assembly 310 further includes comparing means 332 for comparing the local synchronization code and the remote synchronization code. If the synchronization codes are not equal, counting means 334 will begin counting the number of times the synchronization codes are not equal. Unequal synchronization codes represents the non-receipt of command signals from the remote video game 320 which could result from a glitch in the communication lines 318 or any other communication-type breakdown which may occur with the hardware itself. If the local synchronization code and the remote synchronization are equal or match, the player parameters associated with each of the players is then input into memory means 336 which stores these parameters including the local and remote command signals and the local synchronization code therein.

Once all of the information is stored with regard to the locations and parameters of the playing elements, along with the local synchronization code, the interactive video game 310 continues by advancing the local synchronization code and receiving input from local player controls 316.

If, on the other hand, the synchronization codes do not match, the counting means 334 will count the number of times the local synchronization code does not match the remote synchronization code. If the counter 334 exceeds a predetermined value X, typically equivalent up to a one second differential, reset means 338 will reset the counter 334.

Once the reset means 338 has reset the counter 334, retrieving means 340 will retrieve the player parameters and the synchronization code from memory 336 allowing the game to continue back when the local 310 and remote 320 video games were in synchronization. The counting of the non-matching synchronization codes will happen rapidly, the resulting player parameter change is not being apparent to the video game operator.

Figure 6:
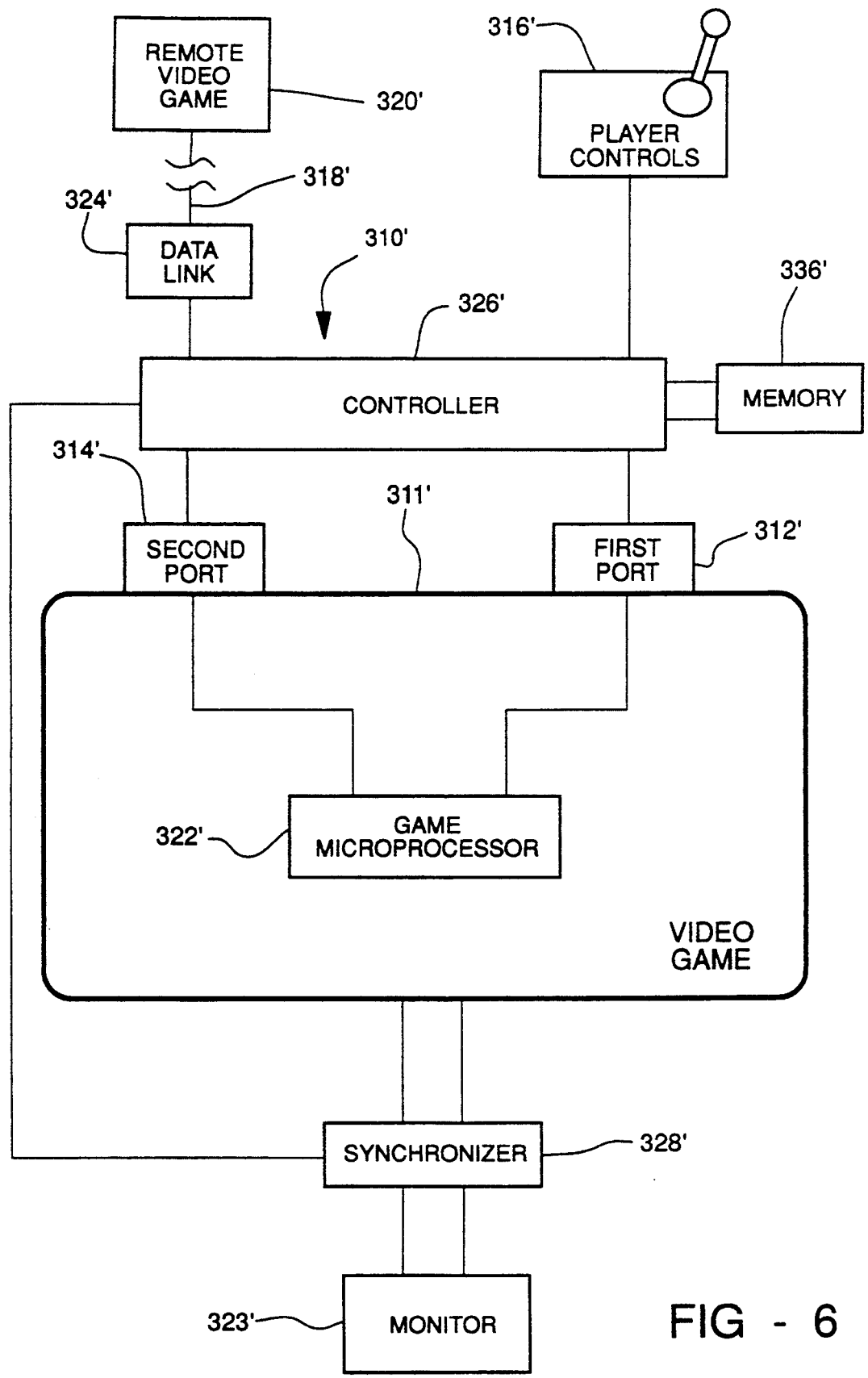
FIG. 6 is a block diagram of an alternative embodiment of the subject invention.

Turning attention to FIG. 6, wherein like primed numerals represent similar parts, an alternative embodiment of the invention is generally indicated with reference numeral 310'. The alternative embodiment is a video game synchronizer 310' adapted to be used with video games 311' which do not have the remote competition capabilities. The video game synchronizer 310' is adapted to receive the local command signals from the set of player controls 316' and transmit them to the first port 312'. The synchronizer, generically represented at 328' in FIG. 6, receives a code from the game microprocessor 322' to synchronize the local and remote command signals as discussed above.

The code received by the synchronizer 328' may take one of two forms. The first form is the frame advancing code currently in the hardware/software. The synchronizer 328' could count the frames and produce the synchronizing code based thereon. The second form could be generated by the game software. The game software developed to be operated by the preferred embodiment would develop a synchronization code. This synchronization code could be retrieved as it is transmitted to the monitor 323' and used directly by the controller 326'.

The controller 326' will send the synchronization code, as well as the local command signals, to the remote video game 320'. Once the data link circuit 324' receives the remote command signals, and the remote synchronization code which matches the local synchronization code, the local and remote command signals are sent to appropriate ports 312'', 314'.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A video game synchronizing assembly (310) adaptable to communicate a local video game (311) with a remote video game (320), the local video game (311) including a game microprocessor (322), at least two player ports (312,314), and a set of player controls (316) electrically connected to one (312) of said two player ports (312, 314), the set of player controls (316) manipulatable to create local command signals to be incorporated in the local video game (311) to define player parameters, said video game synchronizing assembly (310) comprising:

a controller (326) for receiving the local command signals from the set of player controls (316) and remote command signals from the remote video game (320) and for transmitting the local and remote command signals to the local video game (311);

a data link (324) for transmitting the local command signals to the remote video game (320) and for receiving a remote synchronization code and the remote command signals from the remote video game (320), said video game synchronizing assembly (310) characterized by synchronizing means for synchronizing the transmission of the local and remote video command signals by said controller to the game microprocessor (322) of the video game (311).

2. An assembly (310) as set forth in claim 1 further characterized by said synchronizing means (328) including synchronization code generating means (330) for generating a synchronization code.

3. An assembly (310) as set forth in claim 2 further characterized by comparing means (332) for comparing said local synchronization code and the remote synchronization code.

4. An assembly (310) as set forth in claim 3 further characterized by memory means (336) for storing the player parameters and said local synchronization code associated therewith.

5. An assembly (310) as set forth in claim 4 further characterized by counting means (334) for counting the number of times said comparing means (330) compares said local synchronization code which does not match the remote synchronization code.

6. An assembly (310) as set forth in claim 5 further characterized by retrieving means (340) for retrieving said local command signals, the remote command signals, and said local synchronization code when said counting means (334) exceeds a predetermined value.

7. An assembly (310) as set forth in claim 6 further characterized by resetting means (38) for resetting said counting means (334) when said retrieving means (340) retrieves said local synchronization code.

8. A local video game assembly (310) adaptable to communicate with a remote video game (320), said local video game assembly (310) comprising:

a video game (310) having a game microprocessor (322), at least two player ports (312, 314), and a set of player controls (316) electrically connected to one (312) of said two player ports (312, 314), said set of player controls (316) manipulatable to create local command signals to be incorporated in said video game (310);

a data link circuit (324) for transmitting said local command signals to the remote video game (310)

and for receiving remote synchronization code and remote command signals from the remote video game (320);

a controller (326) for receiving said local command signals and the remote command signals and for sending said local command signals and the remote command signals to the game microprocessor (322) to create player parameters, said local video game assembly (310) characterized by synchronizing means (328) for synchronizing the transmission of said local command signals and the remote command signals to said game microprocessor (322).

9. A method for playing a video game between a local video game (311) and at least one remote video game (320), the method comprising the steps of:
starting a video game;
initializing a local synchronizing code;
receiving local command signals;
receiving remote command signals and a remote synchronizing code;
comparing the local and remote synchronizing codes;
sending the synchronized local and remote command signals to the local video game (311).

10. A method as set forth in claim 9 further characterized by storing player parameters of the local and remote video games when the local and remote synchronizing codes match.

11. A method as set forth in claim 10 further characterized by retrieving the stored player parameters when the local and remote synchronizing codes do not match.

12. A method as set forth in claim 11 further characterized by counting the number of times the local and remote synchronizing codes do not match.

13. A method as set forth in claim 12 further characterized by resetting the counting when the stored player parameters are retrieved.

* * * * *